United States Patent [19]

Schumacher

[11] 4,162,821

[45] Jul. 31, 1979

[54] MEANS FOR IN-LINE CONNECTION OF OPTICAL FIBER PAIRS

[75] Inventor: William L. Schumacher, Camp Hill, Pa.

[73] Assignee: AMP Incorporated, Harrisburg, Pa.

[21] Appl. No.: 862,478

[22] Filed: Dec. 20, 1977

[51] Int. Cl.$^2$ .............................................. G02B 5/14
[52] U.S. Cl. .................................................. 350/96.21
[58] Field of Search ................ 350/96.20, 96.21, 96.22

[56] References Cited

U.S. PATENT DOCUMENTS

| | | | |
|---|---|---|---|
| 3,870,395 | 3/1975 | Schicketanz | 350/96.21 |
| 3,904,269 | 9/1975 | Lebduska et al. | 350/96.22 |
| 3,963,323 | 6/1976 | Arnold | 350/96.22 |
| 3,995,935 | 12/1976 | McCartney | 350/96.21 |
| 4,088,386 | 5/1978 | Hawk | 350/96.21 |

OTHER PUBLICATIONS

C. G. Someda "Simple, Low-Loss Joints Between Single-Mode Optical Fibers" Bell Sys. Tech. Journal, vol. 52, No. 4, Apr. 1973, pp. 583-596.

*Primary Examiner*—Rolf G. Hille
*Attorney, Agent, or Firm*—AMP Incorporated

[57] ABSTRACT

A connector means for connecting together two optical fibers whose ends have been stripped of optical cladding to expose the cores. The connector comprises means for gripping the fibers at unstripped sections thereof with a predetermined length of fiber extending from datum or reference surfaces on the connector such that the ends of the stripped fibers face each other and are spaced apart a very short distance of the order of not more than one and one-half times the core diameter. The connector further comprises a pair of elastomeric elements each with grooves of semi-cylindrical cross-section formed therein that fit together to form a cylindrical bore which retains the stripped ends of the two fibers. Because the diameter of the cylindrical bore is less than the diameter of either core retained therein, the resilient walls of the cylindrical bore will give way and will thereby force the ends of the two cores into substantial concentric alignment. The elastomeric elements must be made of a material having an index of refraction which is less than that of the cores and preferably is equal to that of the optical cladding.

8 Claims, 8 Drawing Figures

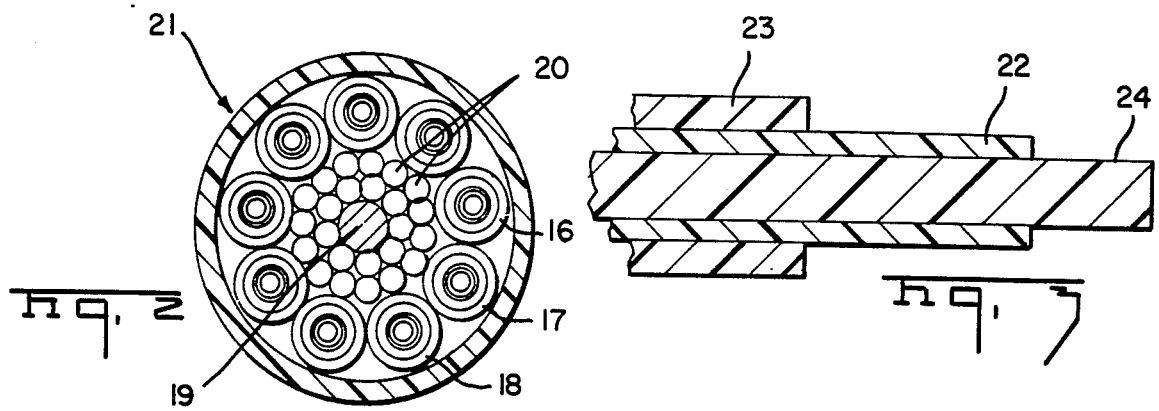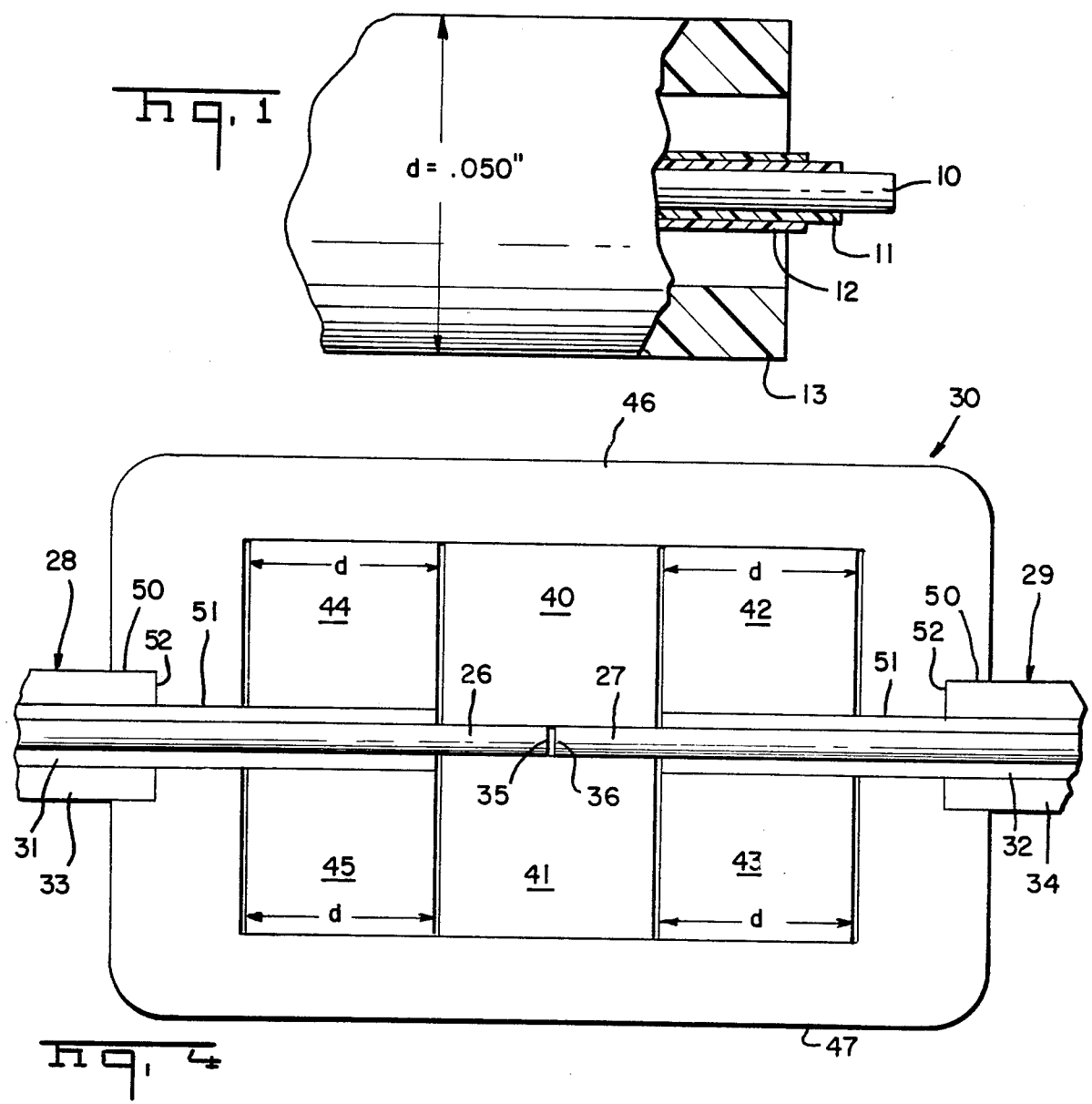

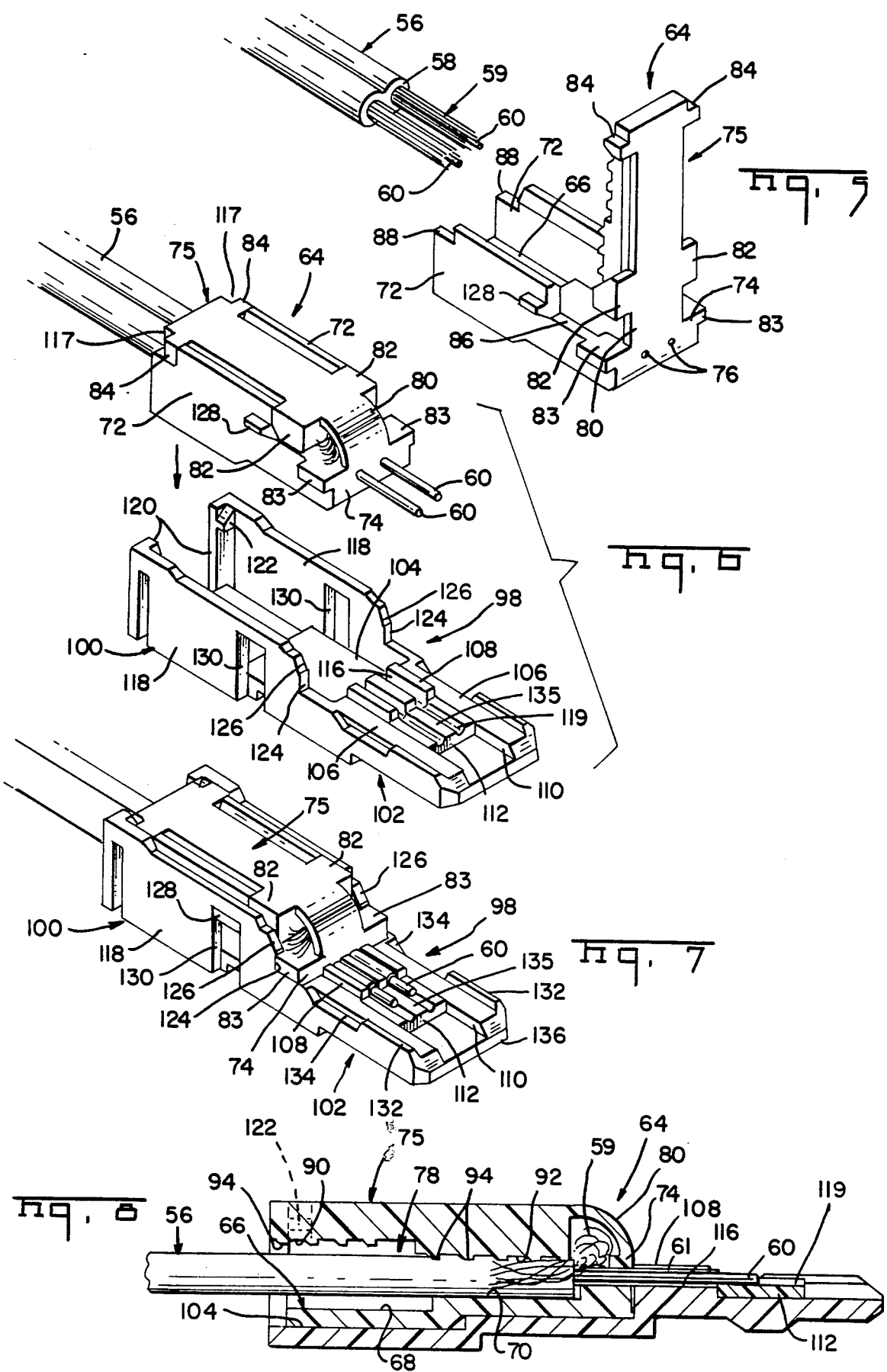

MEANS FOR IN-LINE CONNECTION OF OPTICAL FIBER PAIRS

BACKGROUND OF THE INVENTION

This invention relates generally to a means for connecting together the ends of at least one pair of optical fibers and more particularly to a means for making such a connection wherein the cores of the fibers are better aligned than has been heretofore possible.

One of the problems in the development of optical waveguides for the transmission of modulated light has been the making of in-line connections between the ends of one or more pairs of optical fibers. Such problem consists essentially of the lateral alignment of the two cores of each pair of optical fibers and arises primarily from two causes. One such cause is the variation in the thickness of the optical cladding (hereinafter also referred to simply as cladding) around the core of the optical fiber, which thickness can vary over one hundred percent. For example, in one commercially available optical fiber the nominal thickness of the plastic cladding is about three thousandths of an inch, with the core diameter being about six thousandths of an inch. However, the thickness of the cladding can vary from about one to six thousandths of an inch. Obviously, referencing the alignment of two fibers together by means of the outside diameters of the cladding can result in serious misalignment of the cores. The second major difficulty presented is that the diameter of the cores themselves can vary substantially. A connector for aligning two fibers with reference to the cladding thereon in a concentric manner is disclosed in copending application Ser. No. 768,512 filed Feb. 14, 1977, by William Ludlow Schumacher and entitled "Overlap Type Waveguide Connector Assembly And Method". This Ser. No. 768,512 application grips the cables or fiber at three different points. More specifically, each cable, including its outer sheath, is gripped by a first portion of a first half of the complete connector to provide a coarse alignment of the cables and the fibers therein. Such first portion also provides a datum plane from which to measure an extended portion of optical fiber so that the end thereof will properly mate with the end of another optical fiber contained within a first portion of the second half of the complete connector. Each connector half portion further comprises a second portion which has first grooves formed therein to retain and to provide secondary lateral alignment of the fibers. Preferably both first and second connector halves and their second parts are constructed of rigid material. Each connector half further comprises a third portion made of an elastomeric material which has second, semi-cylindrically shaped grooves formed therein, with each second groove receiving one of the fibers from the second portion of the connector. The grooves contained within the two elastomeric portions are designed to mate with each other to form a cylindrical channel within which a pair of fibers to be connected in an in-line manner terminate with their ends being in very close proximity to each other but without actually touching. Because of the properties of the elastomeric material the two fibers of each pair are aligned with each other in a substantially concentric manner measured from the outside circumference of the cladding. However, because of the wide variation thickness of the cladding, the cores of the fibers are frequently badly misaligned with substantial loss of signal integrity.

Further, with many currently available optical fibers, the cladding is very fragile and often will rupture when pressed between two elastomeric pads, thereby exposing the core to a surface whose index of refraction is higher than that of the core. Perturbation of the light signal results. An additional problem presented with certain types of cladding is that it is difficult to score and break the end of the core in a smooth plane normal to the axis of the core. The cladding interferes with the scoring to produce a non-planar break of the core.

BRIEF STATEMENT OF THE INVENTION

It is a primary object of the invention to provide a connector for connecting together the ends of the cores of one or more pairs of optical fibers with a degree of lateral alignment accuracy between such cores heretofore unobtainable.

It is a second purpose of the invention to provide a connector which accurately aligns the cores of fiber pairs in an in-line connection.

It is a third aim of the invention to provide a connector which eliminates the core alignment error normally introduced by variations in the cladding thickness of a pair of optical fibers connected together by said connector.

It is a fourth aim of the invention to provide a connector which accurately aligns the ends of the cores of a pair of optical fibers connected together in an in-line connection and in which said core ends have had the cladding previously removed.

It is a fifth object of the invention to generally improve means for connecting together the ends of optical fiber pairs in an in-line connection.

In accordance with a preferred form of the invention there is provided in combination a pair of clad optical fibers with those ends of the fibers to be connected together in an in-line manner being stripped of said cladding over a short section extending back from said ends, and a connector for connecting together the stripped ends thereof in the aforementioned in-line connection. Said connector comprises first and second connector halves each having a datum surface and constructed to grip one of said first and second fibers with the stripped end sections thereof extending from said datum surfaces towards each other a predetermined distance. Each connector half further has a core alignment section with a groove formed therein of a suitable cross-sectional configuration such as semi-circular or V-shaped, for example. Each of such grooves is aligned with the extended stripped end section (i.e., the cores) of one fiber of a pair of said fibers and is constructed to receive said extended stripped end section with the end thereof being positioned near the center of said groove. The connector halves further comprise means for becoming secured to each other with the grooves being aligned to form a channel or channel-like enclosure, such as a cylindrical bore, in which the two core end sections are retained with their ends positioned very close to each other but not actually abutting by virtue of the predetermined distance of said extended end sections from said datum surfaces. The core alignment means are formed of an elastomeric material which has an index of refraction less than that of said fiber cores to thereby effectively trap the light within the cores. If the material next to the core has an index of refraction greater than said core then the light within the core can escape into the adjacent material with resulting loss and perturbation of the light signal.

It is not necessary that the channel or channel-like enclosure be completely closed around the cores or that they physically touch all exposed core surfaces since air has a lower index of refraction than the core material and will prevent light from escaping therefrom.

In accordance with a feature of the invention each of the first and second connector halves comprise means for gripping the entire cable including a cable retaining tube, if such tube is present, for coarse alignment of the cable. Each connector half further comprises a groove means for receiving the clad fiber for secondary or intermediate alignment. Each connector half further comprises a third portion thereof which includes the aforementioned grooves for receiving the stripped end sections of the fibers and for retaining such stripped end sections in a concentric alignment with each other.

In accordance with another feature of the invention adhesives can be employed to secure the cores in the grooves in the third portion of the connector. Such adhesives should have an index of refraction the same as that of the cores or of the cladding.

In accordance with still another feature of the invention the cable construction can be circular and contain one or more fibers held in loose or tight fitting tubes and also be of a flat or ribbon shape and contain an array of two or more fibers.

BRIEF DESCRIPTION OF THE DRAWINGS

The afore-mentioned and other objects and features of the invention will be more fully understood from the following detailed description thereof when read in conjunction with the drawings in which:

FIG. 1 is a schematic diagram of a section of an optical fiber contained within a tube in what is known as a loose tube arrangement, and which can be spliced to another fiber in the connector of the present invention;

FIG. 2 is a schematic diagram showing an end view of a cable containing a plurality of the loose tube fiber arrangements of FIG. 1;

FIG. 3 is a cross-sectional view taken along the axis of an optical fiber in which the outside tube or sheathing fits tightly around the clad fiber, the core of which can be connected to the core of another fiber with the connector of the present invention;

FIG. 4 is a generalized schematic diagram of means for connecting the end of one stripped core to the end of another stripped core;

FIG. 5 is an isometric view of a pair of optical fibers contained within a tight fitting sheath and poised for insertion in a terminating structure prior to the in-line splice connection to be implemented by the connector means shown in FIGS. 6 and 7.

FIG. 6 shows a terminated twin fiber cable poised above a connector half which mates with a similar connector half (not shown) for the in-splice connection between the two fibers of a second twin fiber cable (also not shown);

FIG. 7 shows the completed combination of the terminated twin fiber cable with a connector half matable with a similar connector half (not shown in FIG. 7) for connecting the twin optical fibers of FIG. 6 to the ends of another pair of fibers; and FIG. 8 is a longitudinal sectional view of the structure of FIG. 7.

DETAILED DESCRIPTION OF THE INVENTION

Referring now to FIG. 1 there is shown one form of the construction of an optical fiber contained in a loose tube, the core of which can be connected to the core of a similar fiber by means of the present invention. More specifically in FIG. 1 the fused silica core 10 is clad in cladding 11 which can be of a suitable material which has a lower index of refraction than the core 10 such as certain known types of plastics or silicones. Around the cladding 11 there can be another sheathing 12 which is protective in nature and can be of Nylon or Tefzel material. The structure, including core 10, cladding 11 and sheathing 12, fits loosely within a tube 13 whose inside diameter is greater than the outside diameter of sheath 12.

A plurality of loose tube type cables can be enclosed within an overall tubular sheathing, such as sheathing 21 of FIG. 2. Such individual loose tube cables are identified by reference characters 16, 17 and 18, for example. Also usually included in the structure of FIG. 2 is a center strengthening element 19 and strengthening fibers 20.

In FIG. 3 there is shown an optical fiber assembly which includes a core 24 of fused silica or other optically suitable material, a cladding 22, and a protective sheathing 23 which fits tightly around the cladding 22. In some cores now available the index of refraction is greatest in the center thereof and decreases towards the perimeter of the core. This type core requires no cladding since the core itself acts to retain the light. With such a core the coating 22 could be lacquer, for example.

Referring now to FIG. 4 there is shown a schematic type diagram of the basic elements of the present invention. In FIG. 4 the ends of the cores 26 and 27 of cables 28 and 29 are connected together in an in-line splice with their flat, planar ends 35 and 36 being positioned very close to each other, but not touching, within approximately one core diameter. If the end surfaces 35 and 36 are joined together by index matching material they can be separated by one and one half core diameters.

The cores 26 and 27 are normally coated with claddings 31 and 32 which, as shown in FIG. 4, have been stripped away from the end sections of the cores positioned between elements 40 and 41. The elements 40 and 41 are of an elastomeric material having an index of refraction less than that of the cores 26 and 27 and preferably equal or substantially equal to the index of refraction of the cladding 31 and 32. The primary function of elements 40 and 41 is to position the planar ends 35 and 36 of cores 26 and 27 so that they are concentrically aligned with each other. Such alignment is also referred to in the art as lateral alignment, and is accomplished by forming a groove between the elements 40 and 41 in which the ends 35 and 36 of cores 26 and 27 are positioned. Such groove can have cross-sectional configurations of various shapes, such as cylindrical or rectangular, and further need not make contact with the cores until after being compressed by an external force such as connector housing parts 46 and 47. As defined herein the cross-sectional size of the groove is that size it assumes after being assembled around the cores, whether by compression or otherwise.

It is not necessary that the elements 40 and 41 be made completely of a material having an index of refraction less than that of the cores 26 and 27, only that portion which contacts the cores 26 and 27 need have such lower index of refraction. Further, adhesives having an index of refraction equal to that of the cores 26 and 27 or the cladding 31 and 32 can be employed to secure the cores 26 and 27 to the elements 40 and 41.

The cores 26 and 27, which can be fused silica, are fragile and need additional supporting structure as well as preliminary alignment. Such preliminary alignment can be provided by shoulders 52 at the ends of bores 50 in a rigid plastic or metal housing 30, which grip the outside sheathings 33 and 34 of the optical fiber assemblies. Such outer sheathings 33 and 34 are stripped away from the fiber assembly a predetermined distance from the ends 35 and 36 and abut against the shoulders 52 of the connector housing 30 to provide data reference surfaces from which the length of the cores 26 and 27 can be measured to come together properly at bores 35 and 36. The surfaces 51 of connector housing 30 can grip the clad fiber to provide additional support and preliminary alignment therefor.

If desired, further aligning and support of the fibers can be obtained by the elements 42, 43, 44 and 45, which can be of an elastomeric material having a greater degree of resilience than the elastomeric material of elements 40 and 41 so that the effect of the lateral forces of elements 40 and 41 upon the cores 26 and 27 will dominate the lateral forces applied to the fibers by the elements 42 through 45. If the distances "d" are sufficiently small it is possible to eliminate the elements 42 to 45 and substitute air gaps therefor.

For a more specific embodiment of the connector according to the present invention reference is made to FIGS. 5 through 8. FIG. 5 shows an optical cable 56 typically of the type having a sheath 58 containing one or more, and in this case a pair, of optical fibers or wave-guides 60 which are usually encircled by a plurality of flexible strands 59 serving as tension reinforcement for the cable. In the connector each intermating connector section is divided into two parts, a fixture 64 is shown in FIG. 5 and functions to terminate the end of cable 56. The second part is in the form 98 shown in FIG. 6 which is partially rigid and partially elastomeric, as will be discussed later.

As shown in FIG. 8 the fixture 64 comprises a multilevel or step level tray surface portion 66 having a lower planar surface 68 and a step elevated planar surface portion 70. A cable 56 overlies the step tray surface 66 and more particularly is laterally or side-supported against the surface portion 70. The fixture 64 is provided with projecting side walls 72 (see FIG. 5) which are integral with and project upwardly from the tray surface 66. The side walls 72 laterally flank the cable 56 and thereby are properly aligned axially with respect to the cable 56. In FIG. 5 an end wall 74 extends upwardly and outwardly of the tray surface 66 and is integrally joined to the side walls 72. Apertures 76 are provided through the end wall 74 which freely admit therethrough the optical fibers 60.

As shown best in FIGS. 5 and 7 the cable 56 is assembled to fixture 64 merely by inserting the optical fibers 60 through apertures 76 in end wall 74, side-supporting the cable 56 in abutment against the step tray surface 66, and more particularly against the surface portion 70 of surface 66. The flexible strengthening fibers 59 will be readily diverted away from the waveguide fibers 60 upon insertion thereof through apertures 76. Fibers 59 thus will be retained within side walls 72 and will become folded back upon engagement thereof with the end wall 74. The cavity 78 defined by side walls 72, end 74 and the tray surface 66 is then filled with a quantity of adhesive and filler materials, such as epoxy (not shown). The cover 75 is then closed to cover the cavity as shown in FIG. 6. More particularly, the cover 75 is joined to the end wall 74 by a thin web 80 integral both with the cover and the end wall and forming thereby a flexibly yielding hinge. Although the fixture 64 is preferably fabricated from a substantially rigid dielectric, the web 80 is sufficiently thin to be resiliently yieldable when deformed over a radius of curvature as illustrated in FIGS. 5 and 7, thus allowing pivoting of the cover 75 into a closed position.

As shown more particularly in FIGS. 4 and 5, the cover 75 is provided with a pair of integral laterally projecting arms 82 on a forward portion. The rearward portion of cover 75 is provided with a second pair of integral laterally projecting arms 84. Each side wall 72 is provided with a forward notch portion 86 and a rearward notch portion 88 which receives a projecting arm 82 and a projecting arm 84, respectively. The cover 75 thereby is suitably positioned over the fixture cavity in closed relationship, with a portion of each side wall 72 being longitudinally secured between corresponding arm portions 82 and 84.

As shown in FIG. 8 cover 75 has a multi-level stepped undersurface comprising a first level 90 and a second level 92, both of planar configuration and provided thereon with a projecting integral series of rib teeth 94. When the cover 75 is closed the teeth 94 will grip the cable 56 to prevent withdrawal thereof from left to right as shown in FIG. 5. The multi-level cover and the multi-level tray surface 66 cooperate to define two distinct cavity portions of different volumes. As shown, the smaller volume portion of the fixture cavity, defined by the elevated planar surface portion 70 and the cover second level surface portion 92, is adequate to receive and support the cable 56 therein. If a larger diameter cable is utilized, such larger diameter cable can be supported in the larger volume cavity portion, defined by the lower planar surface portion 68 and the cover first level portion 90. Whichever size cable is to be employed, however, the corresponding waveguide or waveguides are freely insertable through the apertures 76 in the end wall 74.

The end wall 74 provides a datum plane which eliminates connector tolerance except for axial separation of the waveguide or fiber core ends. Each projecting fiber 60 is then trimmed and polished and the cladding removed from about one eighth inch back from the end portion thereof. More specifically, at least a portion of the fiber which lies between the elastomeric pads 112 of two mating connector halves should be stripped of its cladding. Each fiber 60 is also trimmed to project a suitable length from the datum plane provided by the end wall 74.

FIGS. 6, 7 and 8 further illustrate a second part of each connector body in the form of a waveguide supporting portion generally indicated as 98. The waveguide or fiber supporting portion of each connector body or connector section is characterized by an open box configuration portion 100 and an integral projecting tongue portion 102. The open box configuration is provided with a stepped bottom surface 104 conforming to the outside surface of the fixture tray surface 66 (FIG. 6). The tongue portion 102 is provided with a planar surface 106 elevated with respect to the surface 104. The surface 106 provides a planar overlap mating face of each connector section. A rearward portion of the tongue portion 102, which is that portion immediately adjacent to the surface 104, is provided with a plurality of upstanding axial rigid ribs 108 which project upwardly from the planar surface 106, thereby providing rigid protection for the waveguides or fibers and preventing cross-talk between adjacent fibers. The forward portion of the tongue 102 is provided with a recess channel 110 in which is disposed a pad 112 of elastomeric material. Such pad 112 of elastomeric material has an index of refraction which is less than that of the fiber cores 60 and advantageously has the same index of refraction as the cladding which has been removed from the ends of the cores 60 in the manner shown in FIG. 3.

The pad 112 is provided with an elongated groove or grooves 119 corresponding to the number of fiber cores or waveguides to be supported therein. The ribs 135 define groove portions 119 in alignment with the grooves 116.

Referring now to FIG. 6 the open box portion 100 is provided with upstanding sidewalls 118. The rearward portions of sidewalls 118 terminate in short, intersecting corners 120 having projecting latches 122 projecting into the cavity receptacle defined between sidewalls 118. Each sidewall 118 has a forward end portion 124 which terminates at the planar surface 106 in axially spaced relationship from the ribs 108. The forward corner portions are chamfered at 126.

The fixture portion 64 is adapted to be assembled to the connector portion 98 in a manner as shown in FIGS. 5, 6 and 7. More particularly, in FIG. 6 it is important to note that fixture 64 is vertically inserted into the open box portion 100, the arms 83 of the fixture 64 being slidably traversed over the chamfered corner portions 126 to place the arms 83 in registration within the space between the ribs 108 and the forward ends 124 of the sidewalls 118. The latches 122 then register with and overlie the rearward notch portions 117 adjacent the arms 84 latching the rearward portion of the fixture within the confines of sidewalls 118. Further, to latch the forward end of the fixture 64, the fixture is provided with a projecting latching tab 128 on each of the sidewalls 72, which tabs 128 register respectively in inverted notches 130 in sidewalls 118. The camming action of the chamfers 126 assure that the datum plane provided by the vertical end wall 74 is precisely in registration against the tongue portion 102. The vertical assembly of the fixture 64 of FIG. 5 will insure that each of the corresponding waveguides 60 will be carefully laid in the groove portions 116 and the grooves 119 of pad 112 of FIG. 6. Thus, the lengths of waveguide 60 which project from datum plane 74 will be carefully laid into and side-supported in the grooved pad 112 and in between the ribs 108. The rigid ribs 108 are greater in vertical height than the diameters of the waveguides 60 and thereby serve to deeply recess the waveguides 60 to provide rigid and substantial side-support therefore and also to protect the waveguides from damage. The datum plane 74 insures that the end faces of waveguides 60 are precisely positioned axially with respect to pad 112 and not more than one and one-half the diameter of each said core, and preferably, less than three-thousandths of an inch.

When two connector halves, each as shown in FIG. 7, are mated together the waveguides or cores 60 will be precisely positioned in end-to-end relationship without actually abutting the waveguide end faces thereof. More particularly, two connector sections or halves, as described in FIGS. 4-7, are assembled together such that the mating faces 106 are initially brought together into overlapped alignment. Then the mating faces 106 are pressed into abutment with each other such that the ribs 108 of one connector half will interfit in the channel 110 of the other mating connector half. The pads 112 of the two connector half sections will overlie each other on opposite sides of the waveguides 60 and will yield elastomerically against each other to sealably compress and encircle each of the waveguides 60, thereby providing surrounding elastomeric seals against light and also against atmospheric contamination.

Because the index of refraction of the pads 112 is less than that of the cores (waveguides) 60, and preferably is near that of the cladding 61, which is similar to the cladding 31 and 32 of FIG. 3, there will be a minimal amount of signal perturbation produced in the cores by the presence of the pads 112. In addition the elastomeric pads 112 provide for concentric alignment of the waveguides axes at the waveguides end faces, without engagement, as described above.

As shown best in FIG. 6 the forward portion of each tongue 102 is provided with a pair of vertical projections 132 on each side edge thereof. The rearward portion of each tongue 102 is provided with recessed portions 134 on each side edge thereof. The projections 132 of one connector section will engage the projection 132 of the other connector section, preventing mutual engagement of the connector mating faces before the waveguide ends are brought together in approximate alignment.

The extreme forward end 136 of each tongue portion will be immediately adjacent the datum plane end wall 74 of the opposite connector section when the two connector sections are in approximate alignment. The projections 132 of one tongue portion 102 must overlie corresponding recesses 134 of the other tongue portion 102 in order to successfully mate together the two connector sections.

It is to be understood that the embodiments of the invention shown and described herein are but preferred forms thereof and that various changes and alternatives will occur to those skilled in the art without departing from the spirit or scope of the invention.

I claim:

1. A connector means for connecting together ends of cores of at least one pair of clad optical fibers with first end sections of said fibers being stripped of their cladding, said connector means comprising:

first and second connector portions each having a datum surface and constructed to grip a respective one of said optical fibers at unstripped portions thereof with said end sections of said fibers extending towards each other from said datum surfaces; and third and fourth matable connector portions connected respectively to said first and second connector portions, respectively, and each having at least one open-sided groove of generally curvilinear cross-sectional shape formed in a surface thereof;

said grooves being matable with each other when said third and fourth connector portions are mated to form at least one generally cylindrically-shaped bore whose diameter is less than the diameter of said cores and being substantially axially aligned with the said unstripped optical fibers gripped in said first and second connector portions;

said first end sections of said at least one pair of optical fibers being retained in said at least one bore between said third and fourth connector portions with their end surfaces in substantial concentric relationship with each other and spaced apart a distance less than three thousandths of an inch;

said third and fourth connector portions further each being substantially comprised of an elastomeric material and with the grooved portions thereof which contact said first end sections having an index of refraction less than the index of refraction of said cores.

2. A connector means as in claim 1 in which:

said optical fibers each having a protective plastic sheathing around said cladding with said plastic sheathing being removed from said fiber at least over the said first end sections thereof; and in which said first and second connector portions support said first and second optical fibers by gripping portions thereof covered by said plastic sheathing and also gripping portions thereof which are clad.

3. A connector means as in claim 1 further comprising:

an adhesive between said stripped first end sections and surface portions of said elastomeric material which make contact with said stripped first end sections;

said adhesive having an index of refraction not less than that of said surface portions and not greater than that of said cores.

4. A connector means as in claim 1 further comprising:

an element of material between said end surfaces of said cores and having an index of refraction substantially equal to that of said cores.

5. A connector for connecting together ends of at least one pair of optical fibers, said connector comprising:

first and second connector portions each having a datum surface and constructed to grip a respective one of said optical fibers with end sections of said fibers extending toward each other from said datum surfaces; and third and fourth matable connector portions connected respectively to said first and second connector portions, respectively, and each having at least one opensided groove formed in a surface thereof;

said grooves being matable with each other when said third and fourth connector portions are mated to form at least one bore smaller than the diameter of each said cores with said bore substantially axially aligned with the remainder of said optical fibers gripped in said first and second connector portions;

said end sections of said at least one pair of optical fibers being retained in said at least one of said bores between said third and fourth connector portions with end surfaces of said optical fibers in substantial concentric relationship with each other and spaced apart a distance not more than one and one-half the diameter of each said end sections;

said third and fourth connector portions further each being substantially comprised of an elastomeric material with the grooved portions thereof which contact said end sections having an index of refraction less than the index of refraction of the outer surfaces of said end sections.

6. A connector as recited in claim 5, in which said optical fibers each has a protective plastic sheathing with said plastic sheathing being removed from said fiber at least over the said end sections thereof; and in which said first and second connector portions support said first and second optical fibers by gripping first portions thereof covered by said plastic sheathing and also by gripping second portions thereof which project outwardly of said sheathing.

7. A connector as recited in claim 5, further comprising:

an adhesive between said first end sections and surface portions of said elastomeric material which make contact with said first end sections;

said adhesive having an index of refraction not less than that of said surface portions and not greater than that of said end sections.

8. A connector as recited in claim 5, further comprising:

an element of material between said end surfaces of said end sections and having an index of refraction substantially equal to that of said end sections.

* * * * *